United States Patent [19]

Schädlich

[11] 4,056,762

[45] Nov. 1, 1977

[54] STROKE ENERGY LIMITED MOTOR-DRIVEN SCREWDRIVER

[75] Inventor: Fritz Schädlich, Stetten, Germany

[73] Assignee: Robert Bosch GmbH, Stuttgart, Germany

[21] Appl. No.: 661,949

[22] Filed: Feb. 27, 1976

[30] Foreign Application Priority Data

Apr. 17, 1975 Germany ............................ 2516951

[51] Int. Cl.$^2$ ............................................ H02H 7/085

[52] U.S. Cl. ..................................... 318/484; 318/434

[58] Field of Search .................... 318/484, 221 R, 487, 318/434, 275, 445, 446, 447, 450, 452, 458

[56] References Cited

U.S. PATENT DOCUMENTS

| | | | |
|---|---|---|---|
| 3,333,175 | 7/1967 | Klyce | 318/487 |
| 3,845,373 | 10/1974 | Totsu et al. | 318/434 |

*Primary Examiner*—Herman T. Hohauser
*Attorney, Agent, or Firm*—William R. Woodward

[57] ABSTRACT

An energy limiting circuit for the operating stroke of a motor-driven screwdriver energized by alternating current is activated in response to a pulse of current amplitude, which may be the starting current of the motor or the first of a series of current amplitude pulses characteristic of screw tightening impacts produced by an impact-type screwdriver. The energy limiting circuit in a simple case is a timing circuit. For operation with strict reference to the impacting energy, the energy limiting circuit is a pulse counter. Adjustment of the timing or of the pulse counting is provided for setting the tool to the conditions of a particular repetitive task.

11 Claims, 8 Drawing Figures

STROKE ENERGY LIMITED MOTOR-DRIVEN SCREWDRIVER

This invention relates to a motor-driven screwdriver, particularly a motor-driven screwdriver of the impact type, having an electric circuit for limiting the amount of drive energy allocated to each operation of a series of operations, the energy being limited to an amount suitable for the depth or tightness of screw insertion in a series of repeated insertions.

A screwdriver for automatic tightening of screws is disclosed in German Published Patent Application (OS) No. 1,703,681 that is provided with a measuring system that determines the approach of the yield point by the change of the tightening torque in relation to the rotary displacement of the screw and shuts off the motor in a response to that measurement. In this device an elastic member is interposed between the motor drive and the screw blade or head, the torsion of which is measured by the measuring system.

German Published Patent Application (OS) No. 1,588,032 discloses a motor-driven screwdriver in which the motor current, which increases with increasing torque applied in tightening a screw, is measured and used as the control magnitude. The voltage drop appearing in shunt to the motor current circuit is supplied to an electronic control circuit that automatically interrupts the motor current circuit when a particular value of tightening torque is reached.

These known devices have the disadvantage that on the one hand they are very expensive for use in well-defined repetitive screw tightening operations and on the other hand that, on account of varying friction resistance as the result of variations in clearance and the presence of dirt, there is a variation in the torque applied to the parts being screwed together and the proper energy limit cannot be determined with sufficient accuracy.

It is also known to connect a device ahead of the motordriven screwdriver which takes the time of application of energy to the tool as a measure for the applied energy and is adjustable for a particular class of screw tightening operation. This device is manually switched in by a separate switch contact during the switching on operation so as to set the time measuring device into operation when the motor screwdriver is started. Furthermore, this type of device is provided with a separate current supply, usually different from that supplied to the drive motor, so that it is of relatively expensive construction.

It is an object of this invention to provide apparatus for the limiting of the energy of a screw tightening operation for a particular repetitive case and to provide such apparatus in a form that is simply built and is reliable in operation with motor drives operating on alternating current.

SUMMARY OF THE INVENTION

Briefly, a pulse of increased amplitude of the motor current of the motor-driven screwdriver is used for automatically starting the energy-limiting circuit. This pulse can either be the pulse produced by the starting current of the motor or, in the case of an impact-type screwdriver, the first current amplitude pulse at the beginning of the impact strokes that finish off the tightening operation. Even with an impact-type screwdriver, the starting current may be used to activate the limiting circuit, but instead of being used for that purpose, that pulse may be damped at the input of the measuring circuit, so that the first impacting pulse may start the measuring circuit.

The limiting circuit can be simply a timing circuit or it can be a pulse counter and in either case can be selectably set for being started by the starting current or by the first impacting pulse. The use of the starting current pulse for activating the limiting circuit has the advantage that particular screw tightening operations or particular impact-drive systems that exhibit no characteristic increase of current after the insertion portion of the operation, when the real tightening begins, can nevertheless be reliably controlled.

The modification of the invention in which the starting current pulse is damped before it reaches the limiting circuit and the first current amplitude pulse at the beginning of the impact-type operation is utilized to start the limiting circuit has the advantage that the impact energy of an impact screwdriver can be measured out accurately only in the impacting part of the operation. When the starting current pulse of the screwdriver motor is utilized for initiating the operation of the limiting circuit, it is desirable to utilize a timing circuit for the limiting of the supplied electrical energy. In this case the aggregate energy for driving in the screw and the thereafter following impact strokes is thereby limited. If, on the other hand, the limiting of the screwdriver energy is carried out by a pulse counter that allows a specific number of impacts, it is more convenient to utilize the first pulse at the beginning of impacting for starting the limiting circuit, because then the impact energy is separately monitored. The electrical circuits required for this last type of operation may be somewhat more expensive than in the case a timing circuit is used, but it is still simpler and more reliable than those heretofore used that measured torque for limiting the screwdriver energy and also provides a more exact limiting of the screw driving energy.

The invention is further described by way of illustrative examples with reference to the accompanying drawings, in which:

FIG. 1 is a diagram of an electric motor-driven screwdriver provided with a circuit for limiting the screwdriving energy interposed in its power supply connection;

FIGS. 2*a* and 2*b* are graphs explaining the manner of operation of a limiting circuit utilizing a timing circuit;

FIGS. 3*a* and 3*b* are graphs explaining the operation of a limiting circuit utilizing a pulse counter;

Figure 1:
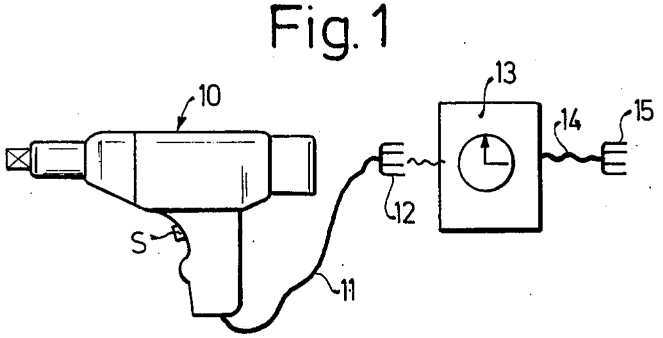

In FIG. 1 an impact-screwdriver 10 is shown that is connectable, by means of a cable 11 and a plug 12, to a circuit for limiting the screwdriving energy for a particular repetitive screwdriving operation. The limiting circuit 13 is connected by a cable 14 and a power plug or tap 15 to any suitable current supply, for example a current supply that has a frequency that is substantially higher than usual 50 or 60 Hz commercial power frequency. The limiting circuit and the screwdriver are supplied with the same kind of current. The limiting circuit 13 can also be integrated into the structure of the impact screwdriver 10, if desired. Furthermore, the limiting circuit can be provided ether with a timing circuit for time-dependent limiting of the screwdriving energy or with a pulse counter for counting out the number of impacts at the end of each operation, as will be further described below.

Figure 2:
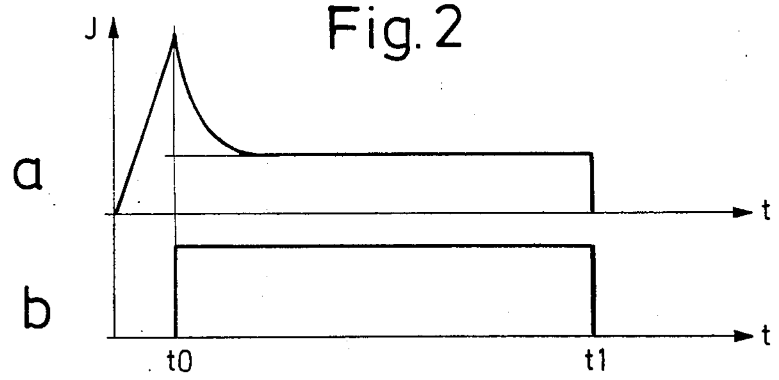

FIG. 2*a* is the diagram of the time course of the motor current of a universal wound motor provided for driving the screwdriver. The current I rises steeply right after the motor is switched on and reaches a value that is substantially above the operating current. This starting current pulse can be utilized to switch on a timing circuit, the operation of which is indicated in FIG. 2*b*. The timing circuit that in this case constitutes the limiting circuit 13 is turned on at the instant *t*0. At the instant *t*1, which has previously been set in the timing circuit for a specific repetitive screwdriving operation, the supply of electric energy to the drive motor of the screwdriver is terminated. When the screwdriver is an impact-type screwdriver, the energy limitation provided in the operation just described covers the energy for both screwing and tightening the screw.

Figure 3:
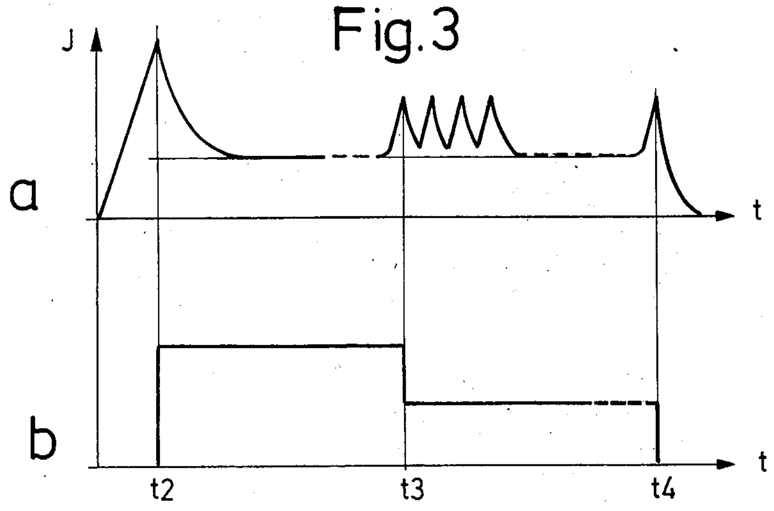

FIG. 3*a* shows the time course of the motor current of an impact-type screwdriver driven by a universal wound motor. When the motor is switched on, the current I at once rises above the steady-state current and then falls to the steady-state current during the operation of inserting the screw, after which the current amplitude oscillates in sawtooth fashion during the impacts provided for tightening. The starting current pulse, as shown in FIG. 3, is utilized to put the limiting circuit 13 in an activated (ready) condition. The limiting circuit 13 is in this case in the form of a pulse counter. The count begins with the first saw-tooth current pulse at the onset of impacting. The pulse counter has an impact count adjustment so that it can be adjusted for a range of particular repetitive screw-tightening operations. The moment at which the starting current pulse puts the pulse counter into readiness for counting is designated *t*2 and the moment of arrival of the first impact current pulse is designated *t*3. The previously set pulse count is reached at *t*4, at which time the motor current is interrupted, stopping and screwdriver. The starting current pulse at *t*2 is not counted in the counting operation in the illustrated case. The control circuit can be modified, however, so that the starting current pulse is fully suppressed and the pulse counter is activated at *t*3 by the first impact current pulse.

Figure 4:
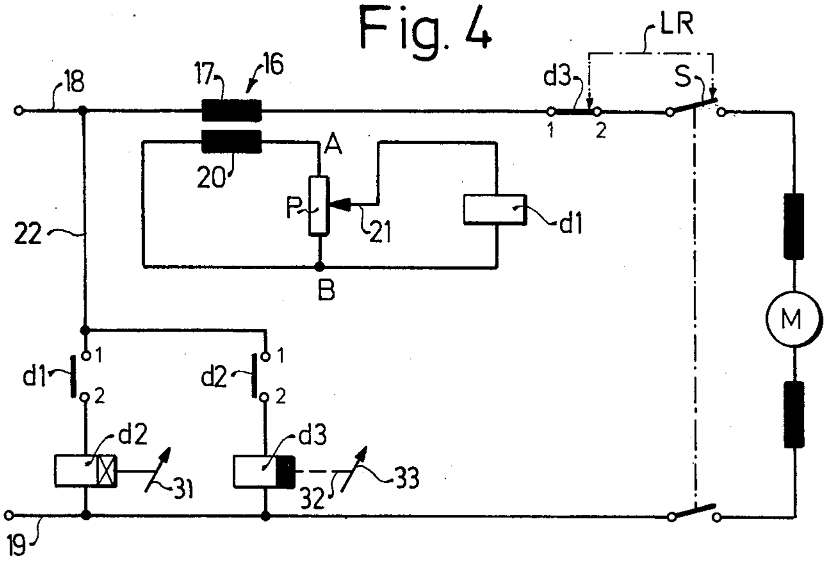
FIG. 4 is a circuit diagram for a limiting circuit utilizing a timing circuit.

FIG. 4 shows a practical example of a control circuit for the screwdriver in which the limiting of the screwdriving energy is accomplished by means of a timing circuit. In the illustrated case, a current transformer 16 with a primary winding 17 interposed in the current supply circuit of a universal-wound motor M that powers the screwdriver serves to supply a control signal to an activating circuit for the timing circuit. The connections 18 and 19 represent the power supply lines of the motor M, provided for connection to an alternating current electric source. That electric power supply source is preferably an alternating current source of a frequency higher than the usual power frequencies, for example of a frequency of 100, 150 or 300 Hz, so that when a universal-wound motor is used as the drive motor an increased power output is obtainable with a driving system that is otherwise unchanged.

In the supply line 18 between the primary winding 17 of the current transformer and the universal-wound motor M is interposed a normally closed set of contacts *d*3/1, 2 of a slow-release relay *d*3 and one of the normally open sets of contacts of a two-pole switch S, of which the other set of contacts (mechanically coupled of course to the first set) is interposed in the supply line 19. The current transformer 16 has a secondary winding 20, the two ends of which are respectively connected to the outer terminals A and B of a potentiometer *p,* of which the movable tap 21 is connected to the winding of an auxiliary relay 21, the other end of which is connected to the terminal B of the potentiometer.

A normally open contact *d*1/1, 2 is interposed in a circuit branch bridging the supply lines 18 and 19 which includes the connection 22 and also the winding of a slow-operate relay *d*2 branching off from the described circuit branch, in parallel with the normally open contact *d*1/1, 2 and the winding of the slow-operate relay *d*2, this parallel branch containing the series connection of a normally open contact *d*2/1, 2 of the slow-operate relay *d*2 and the winding of the previously mentioned slow-release relay *d*3.

The circuit of FIG. 4 works as follows. At a particular moment the switch S is closed and the universal-wound motor M connected to the alternating current supply. The motor current at once increases rapidly and produces a starting current pulse *t*0 (FIG. 2), which causes the timing circuit to be started. This happens because a current flows in the secondary 20 of the current transformer 16 producing a voltage drop between the tap 21 and the terminal B of the potentiometer *p* that is sufficient to operate the auxiliary relay *d*1 and to close its normally open contact *d*1/1, 2 in one of the circuit branches in series with the conductor 22. This energizes the slow-operate relay *d*2, the operating time delay *t*1 of which is so chosen that for a defined repetitive screw insertion and tightening case a sufficient amount of drive energy in terms of the product of time and current magnitude will be made available to the drive motor. The realy *d*2 is provided with an adjustment symbolically shown at 31 for adjusting the delay time to the particular task. At the moment *t*1 the relay *d*2 operates and its now closed contacts *d*2/1, 2 cause the energization of the slow-release relay *d*3, which operates promptly to open its normally closed contacts *d*3/1, 2 and thereby to interrupt the power to the motor M. In so doing, the slow-release relay *d*3 also interrupts the power connection for its own energization, but the release of the relay *d*3 is delayed by its characteristic delay time, giving the operator of the tool time to release the switch S if he does not want the screwdriver to be energized immediately as soon as the relay *d*3 releases. If the operator has released the switch S during the release time of the relay *d*3, the screwdriver will not be energized again until the switch S is again operated. The slow-release relay *d*3 may also be of a type for which the release time can be adjusted, as indicated by the dashed line 32 and the adjustment 33. A dashed line is used here, because this adjustment will not normally be changed between different screwdriving tasks, unless the operator is to be given the opportunity of adjusting this delay time so that he will have time to put the screwdriver in position for the next operation during the release time of the relay *d*3 and thereby save himself from repeatedly operating the switch S in a series of screwdriving operations.

It is of course possible, if desired, to prevent the re-energization of the motor after automatic shut-off until the switch s should have been released by the operator. That can be done by substituting for the slow-release relay *d*3 a latching-type relay, so that the contact *d*3/1,

2 remains open after operation of the relay *d*3 until the release of the switch S unlatches the relay. The latching may be mechanical, controlled by a mechanical latch release operated by the switch S, or it may be a mechanical latching released electromechanically by a winding energized through a back contact of the switch S (not shown). Such latching arrangements are symbolically represented in FIG. 4 by the dashed line LR. There is also the possibility of an entirely electric or electromagnetic latching circuit but, possibly except in the case of an entirely electronic timing circuit, such arrangements are not likely to be economic.

Figure 5:
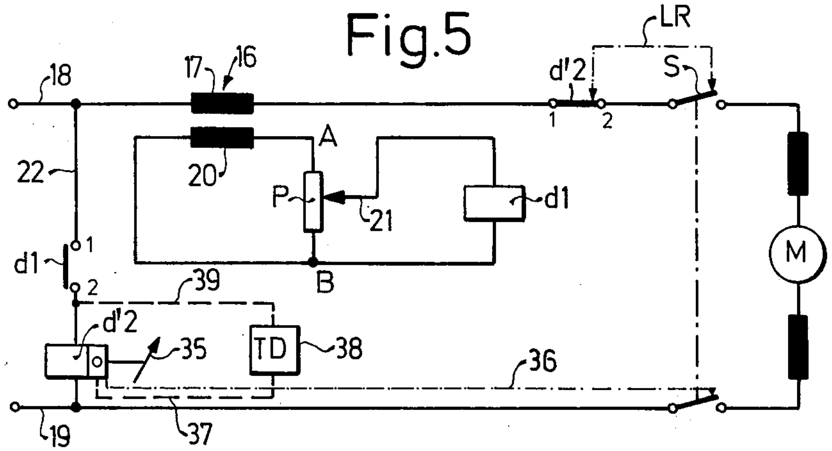
FIG. 5 is a circuit diagram for a limiting circuit utilizing a pulse counter.

FIG. 5 shows a circuit for limiting the impact driving energy for a particular repetitive screwdriving operation by means of a pulse counter that counts out the number of impact-producing spurts of increased current. The manner in which such pulses of increased amplitude of alternating current are provided in an impact-type motorized screwdriver is well known and is therefore not described here. In FIG. 5, components which are essentially the same as those of the FIG. 4 circuit are designated with the same reference numerals. Thus, the current transformer 16 is again provided with its primary winding 17 interposed in the current supply line 18 and the return line to the alternating current supply is designated 19, the switch for starting the screwdriver is designated S and the universal-wound drive motor M. The secondary winding 20 of the current transformer is again connected to energize a potentiometer *p* between the tap 21 and one terminal B of which the winding of the auxiliary relay *d*1 is connected.

In this case the normally open contact *d*1/1, 2 in series with the conductor 22 controls the activation of a pulse counter *d*'2 by completing the connection of the pulse counter between the supply lines 18 and 19. The pulse counter *d*'2 has an adjustment 35 by which it can be set to operate after counting the number of pulses corresponding to the number of impacts required to be provided to the screwdriver for a particular impact-screwdriving task. At a particular moment, the screwdriver is connected to the alternating current supply by manual operation of the two-pole switch S, causing the motor current to increase sharply at first and to reach its maximum at *t*2. During this starting current pulse, a current flows over the primary winding 17 and accordingly also through the secondary winding 20 of the current transformer 16 producing a voltage drop across the potentiometer *p* that is sufficient to operate the auxiliary relay *d*1. In consequence, the pulse counter *d*'2 is switched on and made ready to count; this condition is designated *t*2 in FIG. 3, and continues until the moment *t*3, at which the screw is fully inserted and the first impact is applied to the screw with a corresponding current amplitude pulse. The pulse counter *d*'2 now begins to count and when it reaches the predetermined number of impacts (i.e. the number set by the adjustment 35) the counter operates the normally closed contact *d*'2/1, 2 in the supply line 18 so as to interrupt the motor current. This interruption also deactivates the counter. The counter *d*'2 must be reset for re-operation of the screwdriver and this may be done in various well-known ways, either under mechanical control responding to release of the switch S or electrically by a circuit responding to the release of the switch S or responding to a time delay following the deactivation of the counter.

The resetting of the counter *d*'2 has a number of possibilities. In the first place, as already mentioned, it may be accomplished mechanically or electrically by release of the switch S, as indicated by the dotted line 36, restoring the counter to a position in which it can start a new count and at the same time re-closing the contact *d*'2. On the other hand, in a manner analogous to the timing circuit of FIG. 4, the counter may be reset by a time delay device 38, as indicated by the dot-dash line 37, the time delay device 38 being electrically set into operation at the same time the counter *d*'2 is deactivated, and such resetting of the counter *d*'2 can also restore the closed condition of the contacts *d*'2/1, 2. Still another possibility is to utilize a counter *d*'2 of a type that is automatically reset upon opening of the contact *d*1/1, 2, in which case the contact *d*'2/1, 2 in a motor circuit would have to be provided with a latching and latch-release arrangement as already discussed in connection with FIG. 4 and symbolically shown by the dashed line LR.

Figure 6:
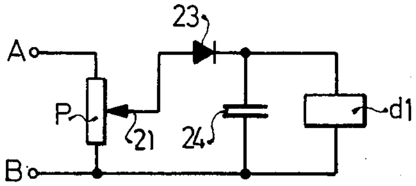
FIG. 6 is a diagram of a modified circuit portion that may be used in the circuits of FIG. 4 and of FIG. 5 for suppressing the effect of the starting current pulse.

FIG. 6 shows a circuit modification by which the starting current pulse at the moment *t*0 (FIG. 2) or *t*2 (FIG. 3) can be suppressed before it can affect the auxiliary relay *d*1. In the illustrated modification, the potentiometer *p* is again connected between the terminals A and B to which the secondary 20 of the current transformer 16 are connected, but a diode 23 is provided in series with the tap 21 of the potentiometer and the winding of the auxiliary relay *d*1 and a capacitor 24 is provided across the winding of the relay *d*1. The starting current pulse charges the capacitor 24, which thus prevents the voltage from building up to the operating voltage of the relay, which accordingly fails to operate. When this modification is applied to the circuit of FIG. 4 that normally operates in accordance with FIG. 2, the timing circuit can be arranged to be switched on at any desired moment, for example after an interval corresponding to the insertion time of a screw, so that the timing circuit will limit only the impacting energy of an impact-type screwdriver. This is most readily done by then utilizing the first current amplitude pulse produced during impacting for starting the timing circuit of FIG. 4, although the starting time could also be determined by another timing circuit (not shown).

When the modification of FIG. 6 is applied to the circuit of FIG. 5 that normally operates in accordance with FIG. 3, the suppression of the starting current pulse at *t*2 can be useful if it is desired to turn on the energy limiting circuit only after the screw insertion operation is complete and the impacting operation begins, rather than to have the counting circuit activated at once and possibly be subject to extraneous variations in applied power during screw insertion.

Although the invention has been described with reference to particular illustrative examples, it is not limited to the particular circuits shown. For example, the electromechanical control arrangements shown in FIGS. 4, 5 and 6 can be replaced by electronic control circuits, electronic timing circuits and electronic counting circuits being so well known that there is no need to illustrate this evident alternative. The relays shown in the drawings, namely, the auxiliary relay *d*1, the slow-operate relay *d*2 and the slow-release relay *d*3 likewise have their electronic counterparts that are well known. These relays themselves, and the counter *d*'2, furthermore, are well-known articles of commerce and need not be further described. Relays of the required characteristics are obtainable from Schleicher GmbH & Co. Relaisbau KG of Pichelswerder Strasse 3-5, 1 Berlin 20, Germany, that manufactures and sells them. In particular the type SZ produced by this firm can be used. A suitable pulse counter can be obtained, for example, from J. Hengstler KG Zaehlerfabrik of 7209 Aldingen, Germany, which produces and sells such a device, under the type designation FO 43 A500.

The invention is particularly useful in motor-driven screwdrivers using alternating current motors, or using universal-wound motors, which are capable of operation on a.c.

I claim:

1. A motor-driven screwdriver having a drive motor capable of a.c. operation and having means for automatically controlling the duration of continuous motor operation, comprising, in combination:

means for shutting off the motor in response to an electric signal;

means for initiating an energy measurement operation in response to the peak portion of the pulse in the amplitude of the drive current in said motor produced by the starting up of said motor;

energy measurement means arranged to be activated by said initiating means for measuring the electric energy supplied to the drive motor after the starting up thereof and for providing an electric signal to said means for shutting off said motor when the measured energy reaches a predetermined value, said energy measurement means being arranged also to be de-activated when said motor is shut off, and means responsive to the lapse of a predetermined time following deactivation of said measurement means for resetting said measurement means before said motor is restarted.

2. A motor-driven screwdriver as defined in claim 1, in which said initiating means and said energy measurement means are supplied with electricity from the same supply source as said drive motor in which means are provided for adjusting said predetermined value of measured energy in order to set said measurement means for a particular series of screwdriving operations and in which said motor shut-off means are arranged to be reset when said measurement means are reset.

3. A motor-driven screwdriver having a drive motor capable of a.c. operation and having means for automatically controlling the duration of continuous motor operation, comprising in combination:

means for causing the motor to operate in impact-producing spurts in the terminal portion of a screwdriving operation;

means for shutting off the motor in response to an electric signal;

means responsive to the first motor current amplitude pulse corresponding to said spurts for initiating an energy measurement operation;

energy measurement means arranged to be activated by said initiating means for measuring, after being started, the electric energy supplied to the drive motor and for providing an electric signal to said means for shutting off said motor when the measured energy reaches a predetermined value, said energy measurement means being arranged also to be de-activated when said motor is shut off, and means for resetting said measurement means before said motor is restarted.

4. A motor-driven screwdriver having a drive motor capable of a.c. operation and having means for automatically controlling the duration of continuous motor operation, comprising, in combination:

means responsive to a pulse in the amplitude of the drive current of said motor for initiating an energy measurement operation including a first auxiliary relay (*d*1) arranged to operate in response to the starting current of the drive motor;

energy measurement means arranged to be activated by said initiating means for measuring, after being started, the electric energy supplied to the drive motor and for shutting off said motor when the measured energy reaches a predetermined value, said energy measurement and motor shutoff means including a slow-operate relay (*d*2) connected so as to be energized by the operation of said first auxiliary relay (*d*1) and itself to operate after a predetermined time and also including a slow-release relay (*d*3) arranged to be energized upon operation of said slow-operate relay and having a set of contacts (*d*3/1, 2) that are closed when the relay is not energized for automatically shutting off the motor when the relay is energized, said slow-release relay being provided with an adjustment controlling the time between energization and armature release for control of the interval during which the current supply circuit (18, 19) of the drive motor is interrupted by said normally closed contacts, and means for resetting said measurement means before said motor is restarted.

5. A motor-driven screwdriver of the impact-drive type having a motor capable of a.c. operation and having operating time controlling means, comprising, in combination:

means for shutting off the drive motor in response to an electrical signal;

counting means for counting the drive motor current amplitude peaks of said motor occurring during the impact-drive terminal portion of a screwdriving operation and for providing an electric signal to said motor shut off means when the counted number of said current amplitude peaks reaches a predetermined number, said counting means also being arranged to be inactivated when said drive motor is shut off;

means for activating said counting means in response to a first pulse of increased current amplitude of the drive current of said motor; and means for resetting said counting means before said motor is restarted.

6. A motor-driven screwdriver as defined in claim 5, in which there are also provided means for adjusting said predetermined number at which said counting means provides said electrical signal.

7. A motor-driven screwdriver as defined in claim 5, in which said means for activating said counting means is arranged to be responsive to the starting current of the drive motor.

8. A motor-driven screwdriver as defined in claim 5, in which said means for activating said counting means is arranged to be responsive to the first current amplitude peak of said motor occurring in the impact-drive portion of a screwdriving operation.

9. A motor-driven screwdriver as defined in claim 6, in which said activating means comprises a first auxiliary relay (*d*1) connected so as to be operated in response to the starting current of the motor and having contacts for switching into operation said counting means and in which said counting means is a pulse counter arranged to control a set of normally closed contacts (*d*'2/1, 2) constituting said means for shutting off the motor and interposed in the current supply circuit (18, 19) of the motor so as to open said contacts when the predetermined number of pulses set by an adjustment of the counter has been counted.

10. A motor-driven screwdriver as defined in claim 5, in which said motor is provided with a manual on-off switch and in which said resetting means is controlled by release of said on-off switch.

11. A motor-driven screwdriver as defined in claim 5, in which said resetting means is responsive to de-activation of said counting means and includes means for producing a delayed response to said de-activation.

* * * * *